(No Model.) 2 Sheets—Sheet 1.
M. RYMAN.
BAND CUTTER AND FEEDER.
No. 427,272. Patented May 6, 1890.
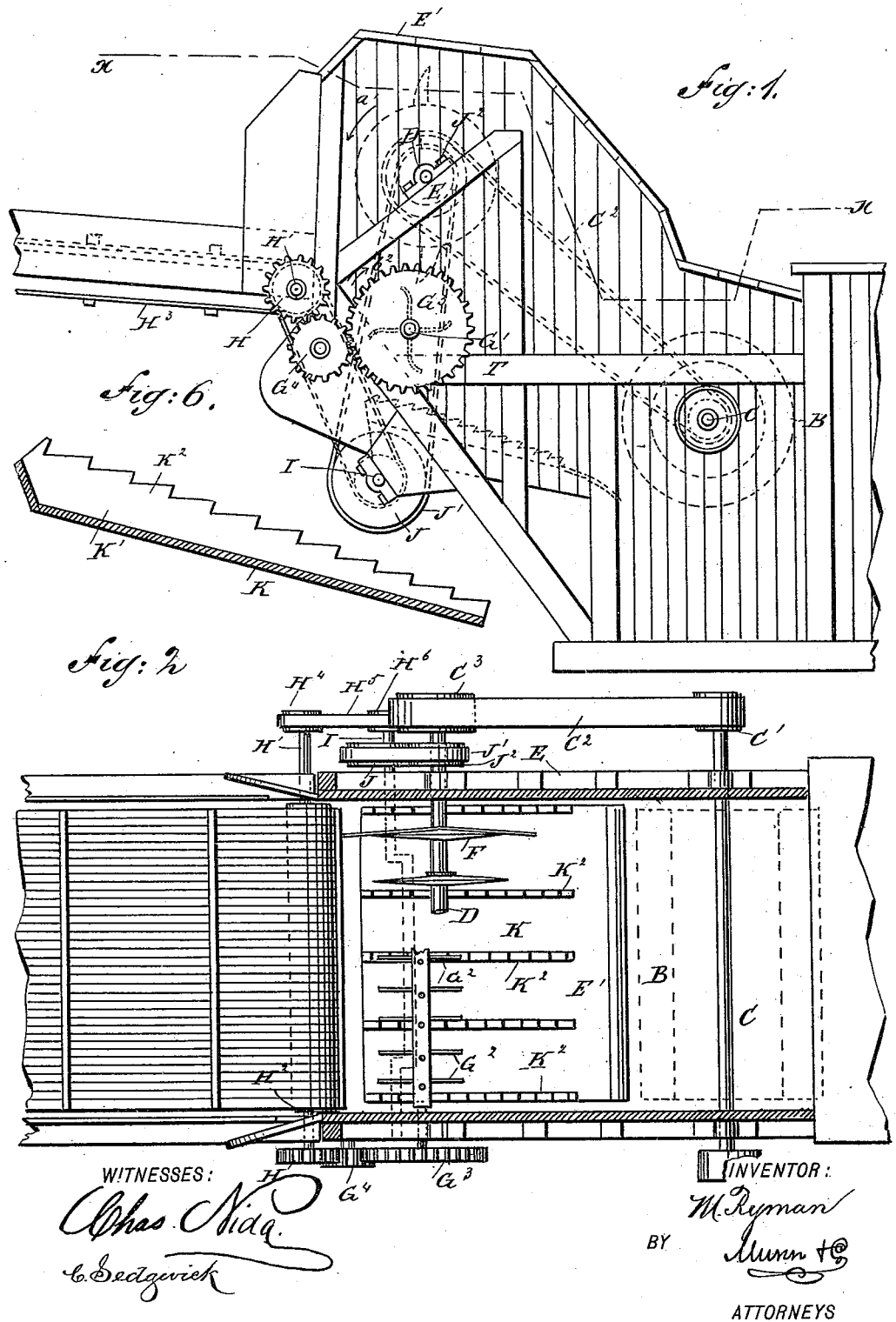

(No Model.) 2 Sheets—Sheet 2.

M. RYMAN.
BAND CUTTER AND FEEDER.

No. 427,272. Patented May 6, 1890.

WITNESSES:

INVENTOR:
M. Ryman
BY
Munn & Co.
ATTORNEYS.

UNITED STATES PATENT OFFICE.

MIKE RYMAN, OF WARNER, (DAKOTA TERRITORY,) SOUTH DAKOTA.

BAND-CUTTER AND FEEDER.

SPECIFICATION forming part of Letters Patent No. 427,272, dated May 6, 1890.

Application filed September 28, 1889. Serial No. 325,369. (No model.)

*To all whom it may concern:*

Be it known that I, MIKE RYMAN, of Warner, in the county of Brown and Territory of Dakota, have invented a new and Improved Band-Cutter and Feeder, of which the following is a full, clear, and exact description.

The object of the invention is to provide a new and improved band-cutter and feeder for thrashing-machines which is simple and durable in construction and conveniently cuts the bands of the sheaves of grain and distributes the latter equally to the beating-drum of the thrashing-machine.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 3:
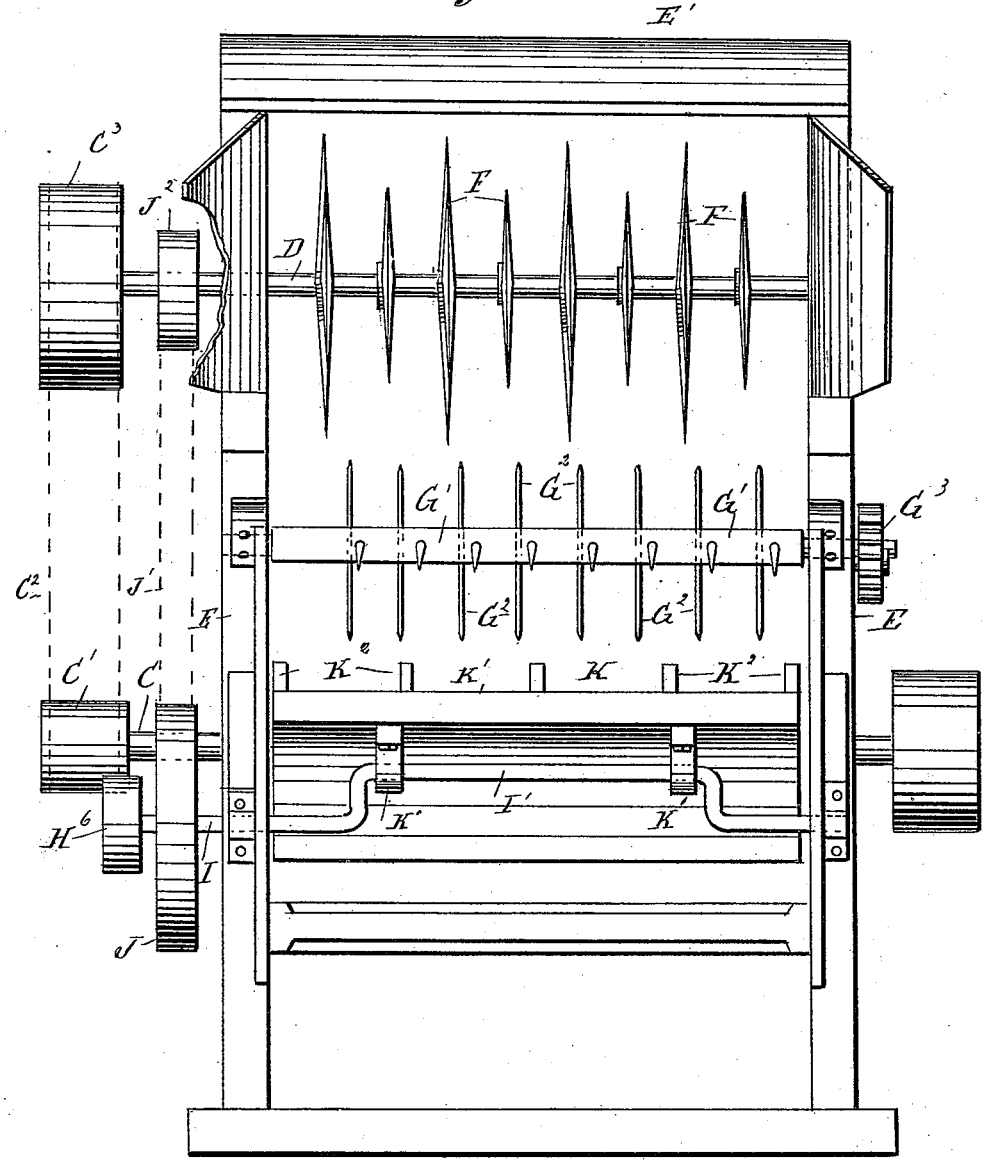
Figure 4:
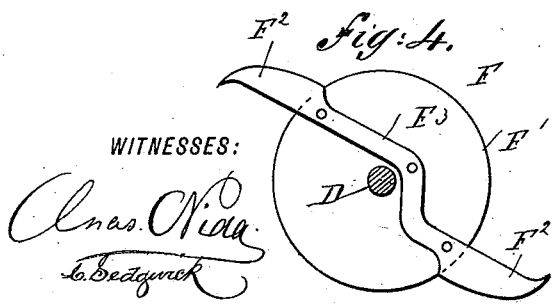
Figure 5:
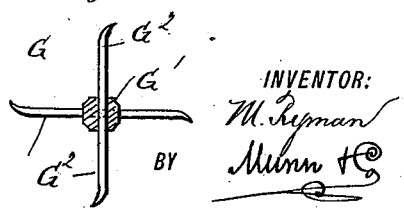

Figure 1 is a side elevation of the improvement as applied. Fig. 2 is a sectional plan view of the same on the line $x\,x$ of Fig. 1. Fig. 3 is an enlarged end elevation of the improvement with parts broken out. Fig. 4 is an enlarged side elevation of one of the band-knives. Fig. 5 is a sectional side elevation of the feeder, and Fig. 6 is an enlarged sectional side elevation of the shaker.

The improved band-cutter and feeder is directly attached to the rear end of the thrashing-machine A, of any approved construction, and provided with the usual thrashing-cylinder B, mounted on a shaft C, extending transversely and carrying on one outer end a pulley C', over which passes a belt $C^2$, also passing over a pulley $C^3$, secured on one outer end of a shaft D, mounted to turn in suitable bearings held on the frame-work E, forming part of the thrashing-machine and supporting a casing E' in front of the thrashing-cylinder E. On the shaft D are secured a series of band-knives F, each provided with a disk F', secured on the shaft D, and carrying two knives $F^2$, arranged opposite each other, and having a common shank $F^3$, secured by rivets or bolts to the said disk F'. The cutting-edge of each knife $F^2$ is curved, so as to conveniently cut the band of the sheaf of grain passing underneath the knife. Directly below the knives F is secured the feeder G, provided with a transversely-extending shaft G', mounted to turn in suitable bearings on the frame-work E, and carrying a series of rods $G^2$, passed diametrically through the said shaft and slightly bent at the outer pointed ends, as is plainly shown in Fig. 5. Two successive rods $G^2$ are placed at right angles to each other.

On one outer end of the shaft G' is secured a gear-wheel $G^3$, meshing into an intermediate gear-wheel $G^4$, meshing into a gear-wheel H, secured on the shaft H', located in front of the feeder G and carrying a roller $H^2$, over which passes the usual endless carrier-belt $H^3$, serving to deliver the sheaves of grain to the thrashing-machine—that is, passing them between the knives F and the feeder G. The shaft H' carries a pulley $H^4$, over which passes an endless belt $H^5$, also passing over a pulley $H^6$, secured on a shaft I, mounted to turn in suitable bearings below the shaft G'. The shaft I carries another pulley J, over which passes an endless belt J', also passing over a pulley $J^2$, secured on the shaft D. The part of the shaft I between the parts of the frame-work E is provided with a crank-arm I', connected with bearings K', secured on the under side of a shaker K, extending between the parts of the frame-work E under the feeder G to within a short distance of the thrashing-cylinder B. The shaker K is provided with an inclined box K', extending downward toward the thrashing-cylinder and supporting a series of longitudinally-extending notched partitions $K^2$, adapted to carry the straw forward to the thrashing-cylinder.

The operation is as follows: When the thrashing-drum B of the thrashing-machine A is set in motion, its shaft C imparts a rotary motion to the knife-shaft D, which latter, by the pulleys $J^2$ and J and the belt J', imparts a rotary motion to the crank-shaft I, which latter imparts a swinging and forward and backward motion to the shaker K. The crank-shaft I, on account of being connected with the shaft H' of the carrying-belt $H^3$, imparts motion to the latter, so that the sheaves of grain placed on the belt are carried forward and fed between the knives F and the feeder G. When the shaft H' rotates, it imparts a rotary motion to the shaft G' of the feeder G by means of the gear-wheels H, $G^4$, and $G^3$. The knife-shaft D rotates in the direction of the arrow $a'$ at a high rate, while the feed-shaft $G'$ rotates in the direction of the arrow $b'$ at a low rate. The sheaves of grain, passing over the end of the carrying-belt $H^3$, pass onto the slowly-rotating feeder G, which by its rods $G^2$ rolls the sheaf up to the knives F, so that the latter cut the band of the sheaf with their knife-blades $F^2$, whereby the sheaf spreads apart over the feeder G and is carried forward by the latter under the thrashing-cylinder B. The kernels falling out of the ears, or ears breaking off, drop into the box $K'$ of the shaker K, and the latter, by its swinging motion, shakes the grain and the straw falling onto its notched projections $K^2$ forward upon the thrashing-concave. (Not shown.)

As a series of knives F is arranged on the knife-shaft, the band on the sheaf will be cut, no matter whether the sheaf passes into the casing $E'$ at one side or at or near the middle. The slow motion of the feeder D retards the forforward movement of the sheaf of grain, so that the knives have ample time to cut the band.

Having thus fully described my invention, I claim as new and desire to secure by Letters Patent—

1. The combination, with the endless carrier and the thrashing-cylinder, of a crank-shaft below the delivery end of the carrier and a shaker mounted at its rear end on the said shaft and delivering to the thrashing-cylinder, two parallel shafts $G'$ D, journaled over said crank-shaft, and between which said carrier delivers, radial feeder-arms on the shaft $G'$ to raise the bundles toward shaft D, and knives on said shaft to sever the bands, substantially as set forth.

2. In a band-cutter and feeder, a cutter comprising a disk $F'$ and two oppositely-facing knives $F^2$, having a common integral shank $F^3$ secured to said disk, and having a bend between its ends to bring the knives into parallel planes at opposite sides of the axis of the disk, substantially as set forth.

3. In a band-cutter and feeder for thrashing-machines, the combination, with a knife-shaft having a fast rotary motion and carrying a series of knives, of a feeder held below the said knife-shaft and provided with a shaft having a slow rotary motion, and rods or arms extending radially from the said shaft and having their outer pointed ends bent, substantially as shown and described.

4. The combination, with the shaft $H'$, having a drum $H^2$, a pulley $H^4$ at one end, and a pinion H at the other, the endless carrier-belt $H^3$, passing around said drum, and the thrashing-cylinder having a pulley $C'$ on its shaft, of a rotary radially-armed feeder-shaft $G'$ just below the delivery end of the carrier, and provided with a pinion $G^3$, geared to the pinion H, the crank-shaft I below shaft $G'$, and having a small pulley $H^6$, belted to pulley $H^4$, and a larger pulley J, the shaker K, mounted at its inner end on shaft I and delivering to the thrashing-cylinder, the knife-shaft D above shaft $G'$ and having cutters or knives, a pulley $J^2$, belted to pulley J, and a larger pulley $C^3$, belted to the pulley $C'$, substantially as set forth.

MIKE RYMAN.

Witnesses:
JOHN BOTHE,
FRANK A. BROWN.